United States Patent [19]

Konno

[11] Patent Number: 5,029,119
[45] Date of Patent: Jul. 2, 1991

[54] PROGRAM GENERATION METHOD

[75] Inventor: Chisato Konno, Inagi, Japan

[73] Assignee: Hitachi, Ltd., Tokyo, Japan

[21] Appl. No.: 307,494

[22] Filed: Feb. 8, 1989

[30] Foreign Application Priority Data

Feb. 9, 1988 [JP] Japan .................................. 63-28481

[51] Int. Cl.$^5$ .......................................... G06F 15/328
[52] U.S. Cl. ...................................................... 364/578
[58] Field of Search ........ 364/579, 578, 200 MS File, 364/900 MS File, 512

[56] References Cited

U.S. PATENT DOCUMENTS

| 4,677,587 | 6/1987 | Zemany, Jr. | 364/900 |
|---|---|---|---|
| 4,742,473 | 5/1988 | Shugar et al. | 364/578 |
| 4,819,161 | 4/1989 | Konno et al. | 364/578 X |
| 4,841,479 | 6/1989 | Tsuji et al. | 364/578 X |
| 4,858,146 | 8/1989 | Shebini | 364/578 X |
| 4,866,663 | 9/1989 | Griffin | 364/578 X |

OTHER PUBLICATIONS

Encyclopedia of Computer Science and Engineering, ©1983 Van Nostrand Reinhold Co. Inc., pp. 603–607, 631–632, 925–933, 1047–1048, 1219–1220, 1297–1301.

Primary Examiner—Parshotam S. Lall
Assistant Examiner—S. A. Melnick
Attorney, Agent, or Firm—Antonelli, Terry, Stout & Kraus

[57] ABSTRACT

A program generation method for generating a program which performs numerical simulation on a computer for a physical phenomenon by entering, to the computer, shape information of a spatial region in which the physical phenomenon takes place, conditions of numerical simulation including variables and constants necessary for the numerical analysis of the physical phenomenon, a partial differential equation using the variables and constants, and initial condition, boundary condition and material coefficient of the spacial region, and equation information including computational procedures. The formula information of an entered simulation model is analyzed to detect lacking information and the shape information of the simulation model is analyzed to detect parts, in correspondence to the shape information, in the spatial region in need of setting further equation information in addition to the first-mentioned equation information, and the detected lacking equation information and information of detected parts are analyzed in need of setting further equation information and the lacking equation information and the detected parts for which the lacking information is to be set are displayed, thereby prompting a user in an interactive manner to enter the lacking equation information, and a numerical simulation program is generated using the information of simulation model entered initially and supplementary equation information entered by the user.

15 Claims, 9 Drawing Sheets $$\text{(1)}\begin{cases} \text{DIV}(\varepsilon \cdot \text{GRAD}(\phi)) = 0 & \text{AT} \quad S1 + S2 + S3 \\ \phi = -50{,}000 & \text{AT} \quad L2 + L6 + L10 \\ \phi = 0 & \text{AT} \quad L1 + L5 + L8 \\ \text{NGRAD}(\phi) = 0 & \text{AT} \quad L3 + L9 \end{cases}$$

$\varepsilon = 1$ AT S1+S3
$\varepsilon = 2500$ AT S2

L1 = SPLINE (P1, P2, P3, P4),  ⎫
L2 = LINE (P6, P7),            ⎬
L3 = LINE (P1, P7),            ⎬ ~32
L4 = ARC (P4, P5, P6),         ⎭
       ⋮

S1 = QUAD (L1, L4, L2, L3),   ⎫
S2 = QUAD (L5, L7, L6, L4),   ⎬ ~33
S3 = QUAD (L7, L8, L9, L10),  ⎭

MESH  L1 = R (10, 0.9)   ⎫
      L2 = R (10, 0.9)   ⎬ ~34
      L3 = D (6)         ⎬
      L4 = D (10)        ⎭

F I G. 3

41 — VAR    PHI,
           ⋮
42 — CONST  EPS=1       AT  S1+S3,
            EPS=2500    AT  S2
           ⋮
43 — BCOND  PHI=-50,000    AT  L2+L6+L10,
            PHI=0          AT  L1+L5+L8,
            NGRAD(PHI)=0   AT  L3+L9,
           ⋮
44 — I COND

46 — SCHEME;
    47 — SOLVE  PHI  OF  DIV(EPS*GRAD(PHI))=0···,

48 — END SCHEME

F I G. 5
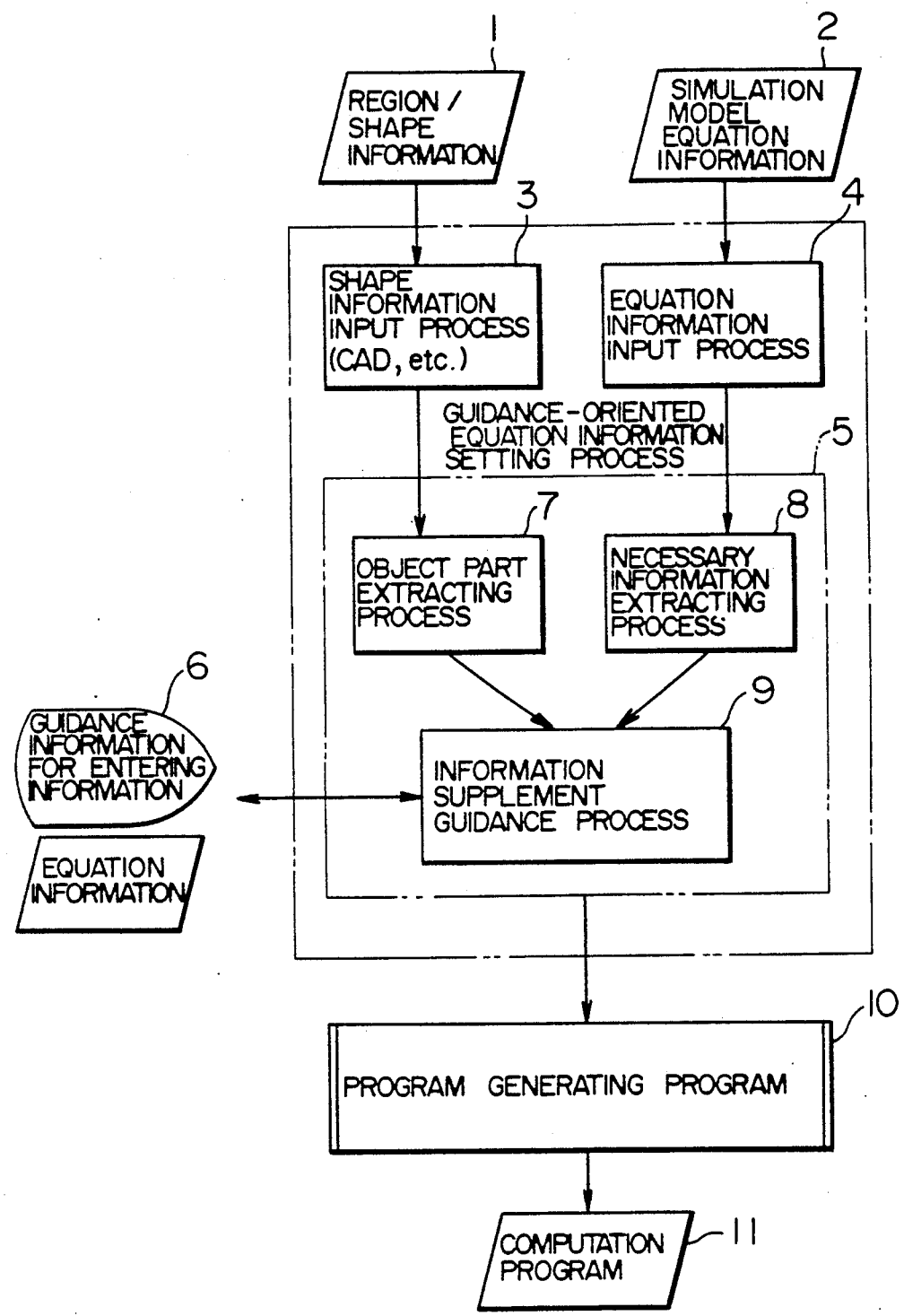

FIG. 8

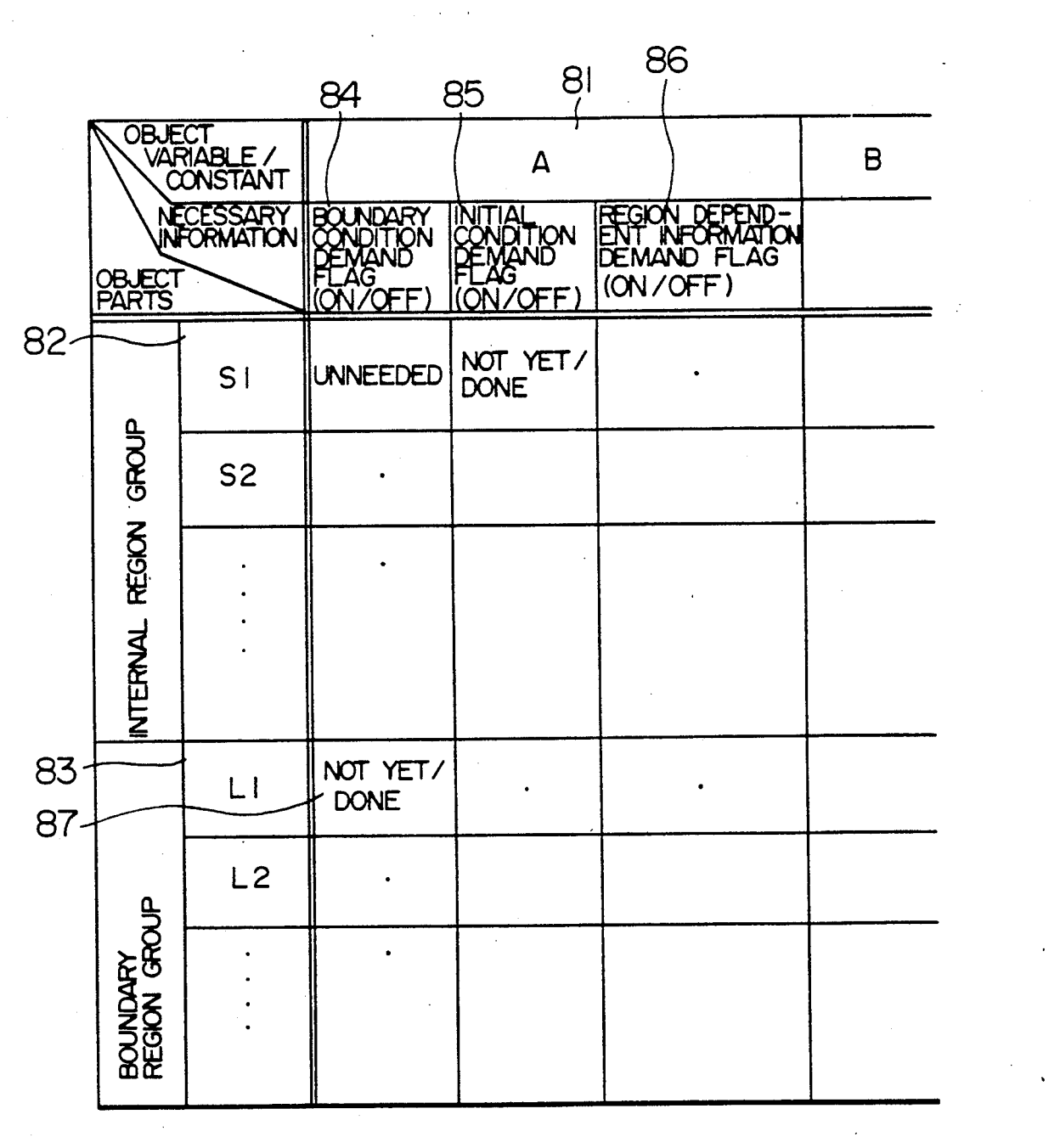

| OBJECT VARIABLE / CONSTANT NECESSARY INFORMATION OBJECT PARTS | | 84 BOUNDARY CONDITION DEMAND FLAG (ON/OFF) | 85 INITIAL CONDITION DEMAND FLAG (ON/OFF) | 81 A 86 REGION DEPENDENT INFORMATION DEMAND FLAG (ON/OFF) | B |
|---|---|---|---|---|---|
| 82 INTERNAL REGION GROUP | S1 | UNNEEDED | NOT YET / DONE | . | |
| | S2 | . | | | |
| | ⋮ | . | | | |
| 83, 87 BOUNDARY REGION GROUP | L1 | NOT YET / DONE | . | . | |
| | L2 | . | | | |
| | ⋮ | . | | | |

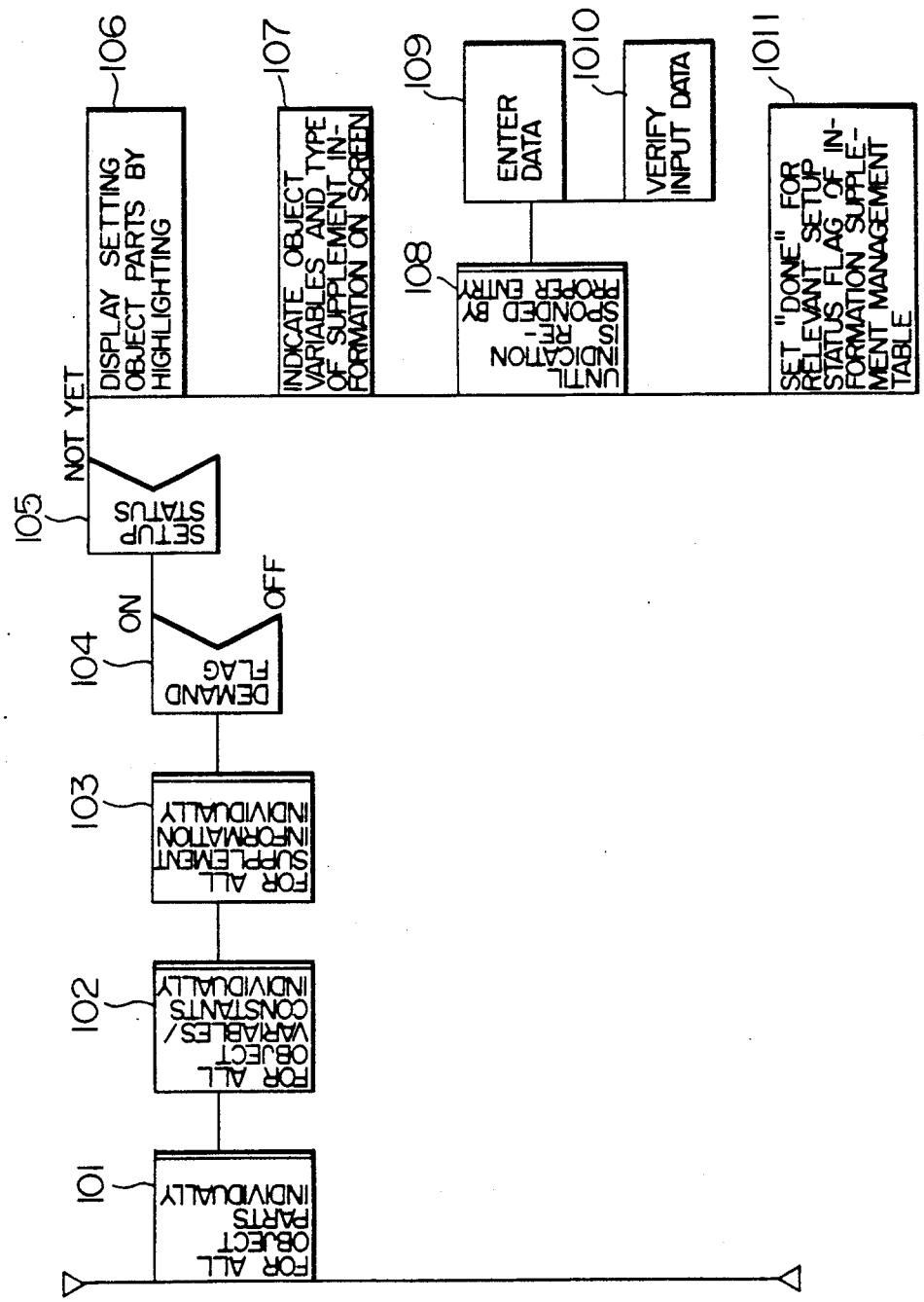

PROGRAM GENERATION METHOD

CROSS-REFERENCES OF THE RELATED APPLICATION

This application relates to U.S. patent application Ser. No. 237,701 now abandoned entitled "Method of Automatically Generating Program for Solving Simultaneous Partial Differential Equations by use of Finite Element Method", and U.S. patent application Ser. No. 245,201 now abandoned entitled "Method and Device for Displaying Information on Simulation Result in a Numerical Simulation System" assigned to the same assignee.

BACKGROUND OF THE INVENTION

This invention relates to a program generation method, and more particularly to a program generation method suitable for utilizing a program generating program for producing, using a computer, a computation program for a computer numerical simulation model which simulates a physical phenomenon such as the potential distribution.

In numerical simulation using on a large-scale computer for analyzing numerically a physical phenomenon of a continuous system, a partial differential equation which represents the potential distribution, electromagnetic field, stress and strain field, etc. is segmented at numerous mesh points of coordinates placed in the region of analysis so that the equation is reduced to simultaneous linear equations or expressions of eigenvalue problems to be calculated using a computer. For the enhancement of the accuracy, stability and convergence of the numerical solution of equations or expressions, it is necessary to arrange mesh points smoothly, concentrate mesh points in regions with a great variation in the value of solution, express the shape of a boundary accurately, correct the calculation order, relative positions, etc. between adjacent mesh points, in the segmentation of coordinate mesh points.

In the conventional program generation method, as described in "Problem Solving Environments for Scientific Computing", pp. 147-162, Elsevier Science Publishers B.K. (North Holland), 1987, and Japanese Patent Unexamined Publication No. 60-140433, for example, information on the shape of a region where a phenomenon takes place and information on the equations of a simulation model which represent the calculation order, etc. of the phenomenon in the region are entered into the program generating program to produce a computation program. An invention derived from the improvement of this prior art is disclosed in the copending U.S. patent application Ser. No. 900,424 filed on Aug. 24, 1986, now U.S. Pat. No. 4,819,161, issued Apr. 4, 1989, which has been assigned to the assignee of the present invention. This is incorporated by reference. In the conventional method, the shape information and equation information necessary for program generation are all entered by the user initially. This operation is tedious in general, and it is very difficult in the case of a three-dimensional shape.

Next, an example of simulation will be explained. FIG. 1 shows an example of a simulation model, FIG. 2 shows an example of shape information of the simulation for the model shown in FIG. 1, and FIG. 3 shows an example of equation information of the simulation for the model shown in FIG. 1.

For example, as shown in FIG. 1, there is a device having a linear upper electrode 22 and a curved lower electrode 23 with a material having a dielectric constant of $\epsilon$ being filled between the electrodes. When a voltage of $-50$ kV is applied to the upper electrode 22 (made up of segments L2, L6 and L10 in the figure) and 0 volt is applied to the lower electrode (made up of L1, L5 and L8 in the figure), the interior potential distribution $\Phi$ is evaluated by solving the Laplace equation in the region 21 of FIG. 1. Namely, as shown by (1) in FIG. 1, with the potential $\Phi$ of the electrode L2+L6+L10 being set to $-50,000$ volts and the potential $\Phi$ of the electrode L1+L5+L8 being set to 0 volt, and with the potential ($\Phi$) of L3+L9 being prevented from leaking in the normal direction, Laplace equation $\text{div}(\epsilon \cdot \text{grad}(\Phi))=0$ is solved for area S1+S2+S3 where area S1+S3 has a dielectric constant $\epsilon$ of 1 and area S2 has a dielectric constant of 2500.

In the conventional method, shape information for the region is given, as shown in FIG. 2, by defining characteristic points P1(x1, y1) and P2(x2, y2) 31 on the electrode line or on the boundary of dielectric constant, and subsequently defining curved segments (L1, L2, L3, ...) 32 with reference to these points, and defining closed planes (S1, S2, S3, ...) 33 which cover the region in concern with reference to these curved segments. Namely, L1 is defined to be a large arc (SPLINE) including P1-P4 which form the curved electrode 23, L2 is defined to be a straight line (LINE) including P6 and P7 which form the linear electrode 22, L3 is defined to be a straight line (LINE) including P1 and P7, and L4 is defined to be a curve (ARC) including P4, P5 and P6 which form an arc (ARC). S1 is defined to be a rectangle (QUAD) including L1-L4, S2 is defined to be a rectangle including L4-L7, and S3 is defined to be a rectangle including L7-L10. In numerical simulation, a continuous region is geometrically represented by a finite number of small areas (meshes) and nodes, and for this purpose division information 34 for these areas is specified. Namely, definition is made that L1 is divided by equal ratio division (R) into ten divisions with common ratio 0.9, L2 is divided by equal ratio division into ten divisions with common ratio 0.9, L3 is divided by even division into six divisions, and L4 is divided by even division into ten divisions.

Furthermore, the conventional method further specifies formula information of the simulation model defined in the region together with the above-mentioned shape information. Namely, as shown in FIG. 3, variables 41 defined in the region, physical constants 42 such as material coefficients, boundary conditions 43, an initial condition 44 which is necessary for a non-stationary problem, and the order of solving the partial differential equation are described as items 46 through 48. Here, VAR is a variable defining PHI ($\Phi$), and CONST is a constant defining EPS ($\epsilon$)=1 in S1+S3 and EPS ($\epsilon$)=2500 in S2. BCOND is a boundary condition defining that PHI=$-50,000$ on L2+L6+L10, PHI=0 on L1+L5+L8, and PHI is no leakage in the normal direction on L3+L9. ICOND is an initial condition, SCHEME and END SCHEME indicate the beginning and end of computation, and SOLVE PHI OF DIV (ESP*GRAD (PHI))=0 directs to solve a partial differential equation $\text{div}(\epsilon \cdot \text{grad}(\Phi))=0$ for $\Phi$.

As described, conventionally, the setting of numerical information related to each part of a region, particularly such as the physical constants 42 and boundary conditions 43, is made by quoting the names (S1, S2, ..

., L1, L2, ..., etc.) which were set in the definition of the shape information.

These are the summary of input information in the conventional program generation method described in the above-mentioned publication. Other methods include a method of information specifying-input for a program which generates a computation program, in which the shape information input process is defined using an interactive graphic processing system (CAD) or the like, and correspondence to the numerical information of the simulation model is made by specifying predetermined names or selecting (or picking up) portions of a shape displayed on a graphic display unit using an interactive input device such as a mouse.

As described, the conventional program generation method determines correspondence between the shape information and numerical information of a simulation model entirely by specifying the names of shape parts or by selecting them using an interactive input device. Accordingly, in the case of an enormous increase in the shape information, it becomes difficult to have management and specification by name. Moreover, in the case of a three-dimensional region concerned, it is difficult to select (pick up) the region visually on the display screen. Namely, it is more difficult to make a selection in a three-dimensional region than doing in a two-dimensional region on the display screen. When a three-dimensional region is concerned, the quantity of shape information is enormous in general, making it extremely difficult to provide a specification by name. Consequently, the conventional method consumes significant labor in producing input data for simulation, and it has been requested to overcome the frequent occurrence of excessive or lacking information in input data.

SUMMARY OF THE INVENTION

It is an object of this invention to overcome the foregoing prior art deficiencies and provide a program generation method with superior operationability, in which the correspondence between shape information and equation information of a region is examined for regional information entered by the user to a generation program for generating a computation program for simulation and lacking information and items to be set are displayed so that the user can easily enter the lacking information.

According to this invention, shape information of a spatial region in which a physical phenomenon to be simulated numerically takes place, variables and constants necessary for the numerical analysis of the physical phenomenon, a partial differential equation using the variables and constants, conditions of numerical simulation including initial conditions, boundary conditions and characteristic values in the spatial region, and equations including computational procedures are entered to a computer so that the computer generates a program for simulating the physical phenomenon numerically. Equation information of the entered simulation model is analyzed to detect lacking information, and the shape information of the simulation model is analyzed to detect items corresponding to the shape information in the spatial region for which the setting of formula information is needed in addition to already determined formula information. Then detected lacking formula information and detected information of items for which setting of equation information is necessary are analyzed to display items for which lacking equation information and lacking information are to be set, thereby prompting the user interactively to enter the lacking equation information, and the numerical simulation program is generated using the initially-entered simulation model information and user-entered supplementary equation information.

In accordance with this invention, attention is given to the fact that inherent shape information of a region and equation information of a simulation model exist completely independently and the fact that there is a master-slave relation among equation information. Further, correspondence between the shape information and equation information is made without the specification by name or selection by the user, and moreover it is intended to provide an entry without the occurrence of excessive or lacking information. Namely, items with the possibility of information setting among portions of shape information quoted by the equation information are extracted only from the shape information, and reference is made to the next part of the equation information to extract the type of equation information which have quoted the portions of shape. The excessiveness or lack of equation information are examined by comparing the extracted information (items and type) with the entered equation information, and, for a lack of equation information, portions of the region are selected sequentially and automatically to prompt the entry of the equation information in a guiding manner.

More particularly, as mentioned previously, among the shape information of a region, a candidate portion of the region is determined in which boundary conditions and physical constants can be extracted only from the shape information. For example, boundary portions of a region in which boundary conditions need to be set are, in the case of two dimensions, sides forming a boundary with the outside without being shared by two closed planes among the curved section, and these portions can be extracted only from the shape information. Portions of a region in which physical constants need to be set are regarded, in the case of two dimensions, as individual closed planes and an assembly thereof, and they can also be extracted only from the shape information. Namely, for sides which needs the setting of boundary conditions and portions necessary for the setting of physical constants, portions of a region that are candidates of quotation or setting by the equation information can be extracted regardless of the simulation model at the definition of the shape information.

Since the equation information for the simulation model has a master-slave relation, as mentioned previously, equation information which quotes shape information is derived on the basis of definition of one equation information. For example, in the example of FIG. 3, declaration 41 of variables yields the possibility of setting boundary conditions to the boundary section, and by specifying the solution 47 of the partial differential equation having these variables as object variables, the necessity of boundary conditions is established. Namely, from the variable declaration 41 and equation solution specification 47, it can be judged that the definition of the boundary conditions 43 becomes necessary. Also in the definition 42 of material coefficients, by judging whether one material coefficient is defined over the entire region, the existence of an excess or lack of equation information can be determined.

As described, setup candidate items are extracted from shape information, a part of the equation information is used to extract equation information associated with the shape information, and each candidate item and the variables and boundary conditions for that item and a necessary information type, such as material coefficient, are offered sequentially to the user so that complete equation information is constructed through the interactive entry of the information.

According to this invention, the correspondence between shape information and equation information can be made without specifying the quotation and selection of names, and setting for a complex shape can be done easily, whereby the shape information and equation information which describe simulation can be merged promptly and surely and a computation program for the simulation can be generated accurately.

BRIEF DESCRIPTION OF THE DRAWINGS

These and other objects and advantages of this invention will become more apparent from the following description and accompanying drawings in which:

FIG. 2 is a diagram showing shape information for the region of analysis in FIG. 1;

FIG. 3 is a diagram showing equation information of FIG. 1;

FIG. 5 is a functional block diagram showing, as an embodiment, the program generation method according to this invention;

FIG. 8 is a diagram showing the contents of the information supplement management table produced and used by the information supplement guidance process in FIG. 5;

FIG. 10 is a detailed flowchart of the region-correspondent guidance input process in FIG. 9.

DESCRIPTION OF THE PREFERRED EMBODIMENT

Figure 1:
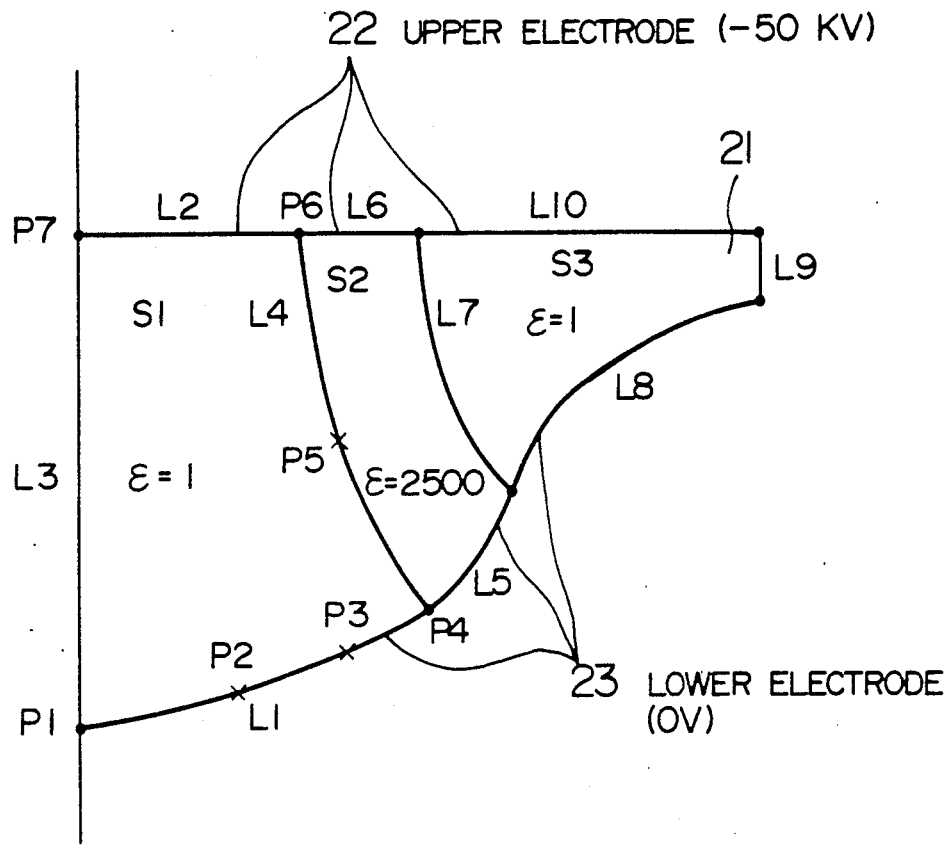
FIG. 1 is a diagram showing an example of simulation models.

The present invention will be described in detail with reference to the drawings.

FIG. 5 is a functional block diagram of the program generation method embodying this invention. The inventive program generation method is divided roughly in a functional sense into an input process (program) 3 for shape information, an input process (program) 4 for equation information, a guidance-oriented equation information setting process (mostly program) 5 for prompting the operator to enter information on the interactive basis by displaying lacking information in the already entered information, and a program generating program 10 for generating a computation program using the whole necessary shape information and equation information. For the last-mentioned program generating program 10, a conventional one can be used, and explanation thereof will be omitted here. The above shape information input process 3, equation information input process 4 and guidance-oriented equation information setting process 5 are implemented by one or more computers. In the example of FIG. 5, they are implemented by a single computer.

The computer has an input of shape information 1, as shown in FIG. 2, for the region where the physical phenomenon to be simulated takes place and an input of equation information 2, as shown in FIG. 3, which indicates the procedure of computation in the computer for the simulation of the phenomena, and, after excessive or lacking information has been compensated in the guidance-oriented equation information setting process 5, the computer operates on the program generating program 10 to produce a simulation program 11 using the whole input information.

The inventive program generation method differs from the conventional generation method in that complete equation information may not be arranged and part or all of equation information which is set additively to the shape information 1 may be missing.

Figure 4:
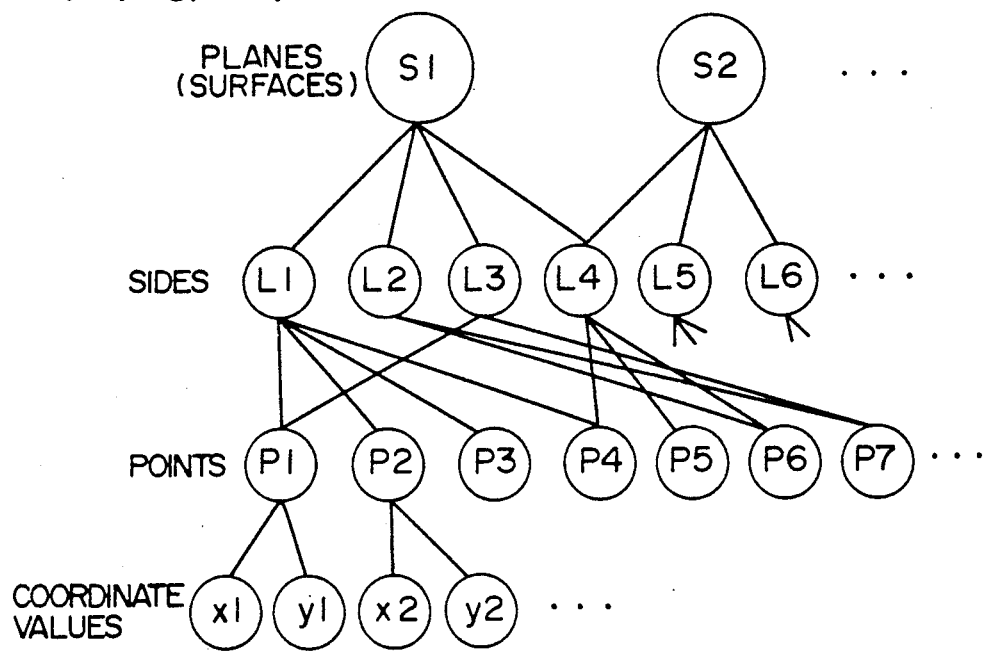
FIG. 4 is a diagram showing the hierarchical structure of the region shape in FIG. 1.

The shape information input process 3 extracts, from shape information 1 as shown in FIG. 2, general information which controls coordinate information and hierarchical relation among shapes, e.g., hierarchical information shown in FIG. 4. The equation information input process 4 extracts equation information 2 as shown in FIG. 3, and performs a syntax check and verifies whether the quoted variables are already defined. For the shape information input process 3 and equation information input process 4, the programs described in "Problem Solving Environments for Scientific Computing", pp. 147–162, Elsevier Science Publication B.V. (North Holland), 1987, or JP-A-60-140433 may be used, for example.

The guidance-oriented equation information setting process 5 comprises an object part extracting process (program) 7, a necessary information extracting process (program) 8 and an information supplement guidance process (memory and processor) 9. Among these sections, the object part extracting process 7 extracts the number of closed planes and curved segments of each closed plane for the input shape information on the basis of only the shape information, as will be explained with reference to FIG. 6, thereby to judge whether or not setting of the boundary condition, initial condition and material coefficient is needed. The necessary information extracting process 8 analyzes the equation information entered in the equation information input process 4 and verifies the equation and content of constants for each variable, as will be explained with reference to FIG. 7, thereby to judge for each variable and constant in the equation information whether or not setting of the boundary condition, initial condition and material coefficient are needed.

The information supplement guidance process 9 compares information provided by the object part extracting process 7 and necessary information extracting process 8 to detect lacking information in the equation information. Namely, as will be explained with reference to FIG. 8, it produces in memory a table of object parts, object variables, constants and necessary information, and detects lacking information on the basis of the table. It prompts the user, in an interactive manner, to provide a setting for each object part or for each object variable/constant and necessary information, so that the whole associated information is set consistently for the shape information in the equation information.

As a result of information entry following such guidance, the required amount of shape information and equation information are set, and an accurate simulation model is stated in this stage. Next, by passing the setup shape information and equation information on to the program generating program 10 and executing the program 10 which uses this information, the numerical computation program 11 is generated. For the program generating program 10, programs described in publication "Problem Solving Environments for Scientific Computing", pp. 147–162, Elsevier Science Publishers B.V. (North Holland), 1987, or JP-A-60-140433 may be used, for example.

Next, the details of each process in FIG. 5 will be described along with the operational flow. For the shape information 1 of the region where the problem is defined, the same information as the conventional one shown in FIG. 2 may be used also in this invention. Next, for the equation information 2 of the simulation model which describes the phenomenon and describes the procedure of solving the phenomenon numerically, the inventive method does not require that the complete formula information is supplied at the beginning, as shown in FIG. 3, in contrast to the conventional method. Namely, among the information of FIG. 3, the equation information (e.g., material coefficients 42, boundary conditions 43, initial condition 44, etc.) that is set by quoting the name of each part of a region will be asked for entry by the guidance if all or part of information is missing, and therefore it does not matter. In any event, the minimal necessary information required at the beginning is the names of variables 41, names of constants 42 and numerical analysis procedures 46–48 for solving the formula.

Next, the shape information input process 3 generates the hierarchical structure information shown in FIG. 4 by using information 31 related to coordinate values of the shape and information 32 and 33 indicative of the relation with the lower structure of each side and plane and the organization, among the information shown in FIG. 2. The information can be produced easily starting from a high-order structure including the planes S1, S2, and so on in FIG. 4, and linking them sequentially to low-order structures including sides and points.

Next, the equation information input process 4 enters part of the equation of FIG. 3, and implements a syntax check for equations included in the information and the check of a definition reference relation thereby to verify the consistency of the model. The definition reference relation check is to verify that the variables and constants quoted in the execution statements 46–48 are already defined in 41 and 42.

Next, the information generated by the shape information input process 3, i.e., the hierarchical structure information of the shape shown in FIG. 4, is passed on to the object part extracting process 7 within the guidance-oriented equation information setting process 5. The object part extracting process 7 extracts setup object parts from the hierarchical structure information of FIG. 4 by paying attention, in case of two dimensions for example, that the material coefficient and initial condition are set for each closed plane or each assembly thereof and the boundary condition is set to curved segments which form the boundary of the region.

Figure 6:
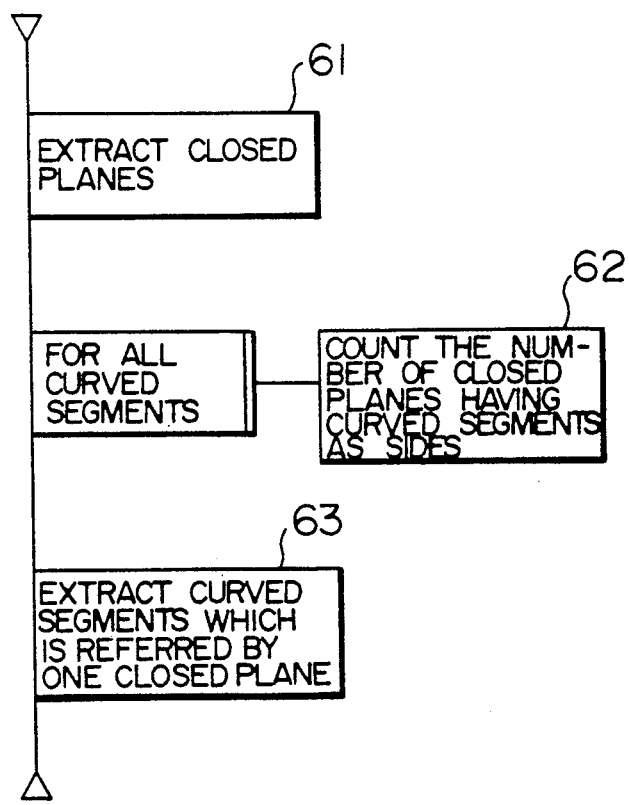
FIG. 6 is an operational flowchart of the object part extracting process in FIG. 5.

FIG. 6 is an operational flowchart of the object part extracting process 7 in FIG. 5.

Initially, closed planes are extracted out of the shape information: (step 61). This process is readily realized by searching hierarchical structure information for planes (S1, S2, etc.) which are the high-order structure. Next, for extracting boundary sides, sides which are not shared by two or more closed planes are searched. For this purpose, the number of closed planes having curved segments as sides are counted for all curved segments: (step 62). Only curved segments having one count of a reference closed plane are extracted: (step 63). In this way, the object part extracting process 7 extracts closed planes and boundary sides and passes them on to the information supplement guidance process 9.

Next, the necessary information extracting process 8 makes reference to declaration parts 41 and 42, execution statement 47, etc. among the information shown in FIG. 3 to extract candidates of variables and constants which need equation information that has quoted the shape information, and extracts information necessary for setting on the basis of the reference state of the execution statement 7.

Figure 7:
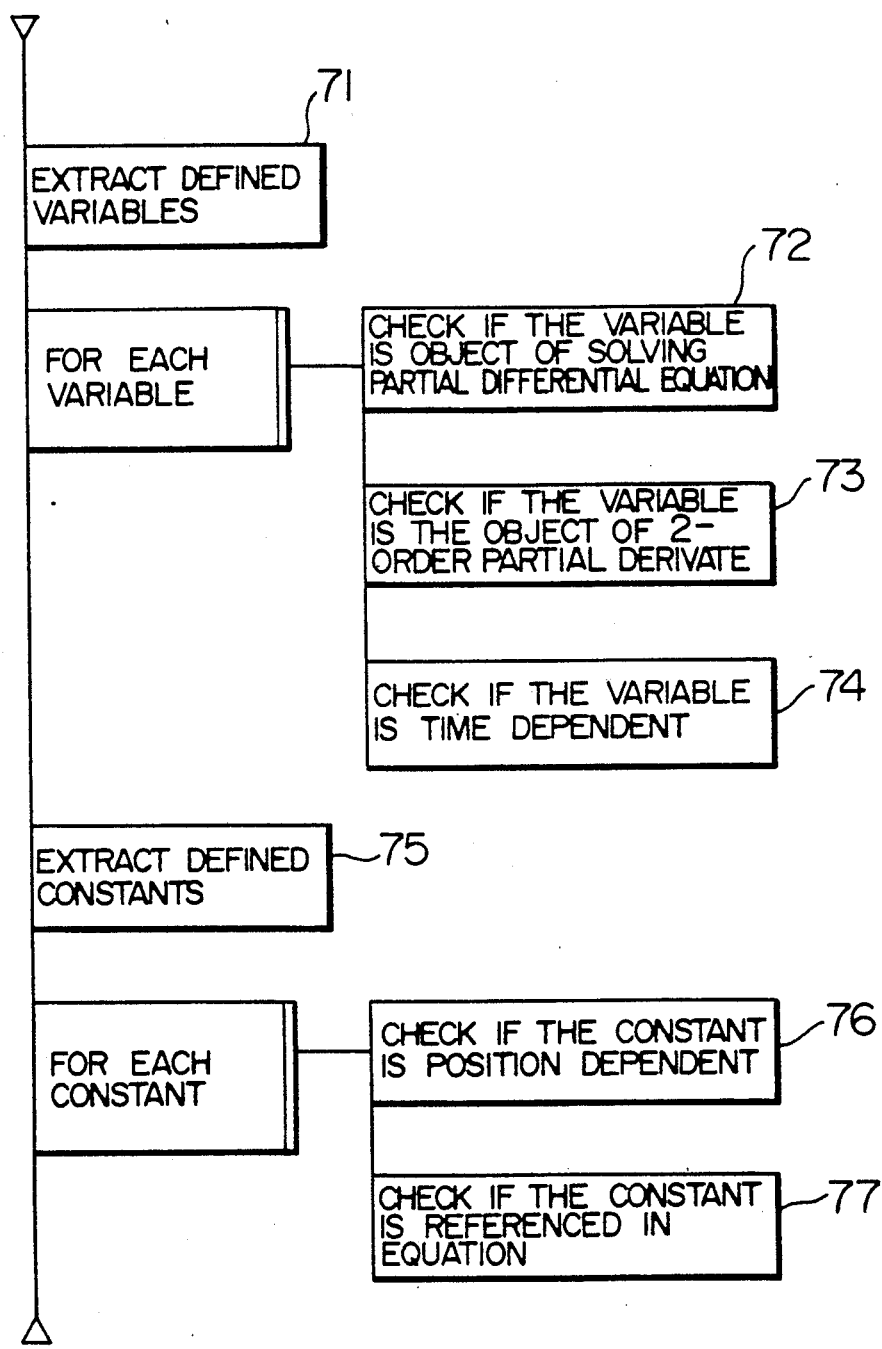
FIG. 7 is an operational flowchart of the necessary information extracting process of FIG. 5.

FIG. 7 is an operational flowchart of the necessary information extracting process 8 in FIG. 5.

Initially, variables which have been declared are extracted: (step 71), and for examining whether or not a boundary condition and initial condition are needed for each variable, discrimination is conducted as to whether the variable is an object variable for solving the partial differential equation: (step 72), whether the variable is the object of a second-order partial derivative: (step 73), and whether the variable is time dependent: (step 74). Namely, whether or not a boundary condition is needed is determined based on the variable being an object variable for solving the partial differential equation and the variable being operated by a second-order derivative, and whether or not the initial condition is needed is determined based on the variable being time dependent, and therefore the execution statement is searched for detecting whether or not the setting of both conditions is needed for each variable. Next, constants which have been declared are extracted: (step 75). For determining whether or not a setting of information which has quoted the shape is needed, an examination is conducted for each constant as to whether the constant is dependent on each part of a shape: (step 76), and whether the constant is referenced in the equation of the execution statement: (step 77). In this case, for example, in determining the positional dependence for the declaration of a material coefficient 42 in FIG. 3, the user may give in advance the attribute of dependence/independence to the shape, or alternatively a rule may be established such that in quoting a constant it is regarded to be position dependent if the differential operation is carried out in the equation. In this way, the necessary information extracting process 8 enters the type of necessary information for the extracted variables and constants to the information supplement guidance process 9.

Next, after the object part of setting the condition and value extracted in the previous object part extracting process 7 and the type of necessary information for the variables and constants extracted in the necessary information extracting process 8 have been entered, the information supplement guidance process 9 indicates excessive or lacking information to the user in an interactive manner, thereby realizing a complete matching of the shape information 1 and equation information 2.

Figure 9:
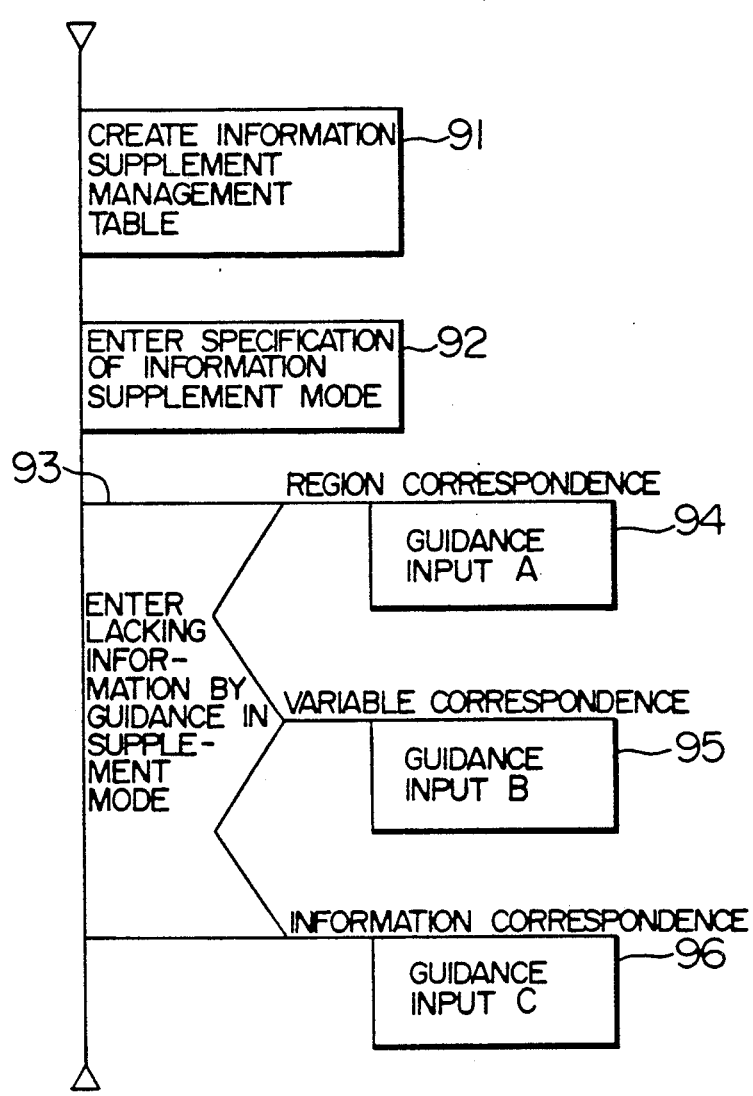
FIG. 9 is an operational flowchart of the information supplement guidance in FIG. 5.

FIG. 9 is an operational flowchart of the information supplement guidance process 9 in FIG. 5, and FIG. 8 is a diagram showing the contents of the table provided for the information supplement guidance process.

The information supplement guidance process 9 first produces an information supplement management table as shown in FIG. 8 using information and equation information 2 extracted from the object part extracting process 7 and necessary information extracting process 8, respectively: (step 91).

Here, the information supplement management table 5 is to provide the correspondence in a matrix fashion between the setup object parts extracted by the object part process 7 and object variables/constants and necessary information extracted by the necessary information extracting process 8, as shown in FIG. 8. Among the information, registered in the setup object part are an internal region group (S1, S2, etc.) 82 in which the initial conditions, material coefficients, etc. are set and a boundary region group (L1, L2, etc.) 83 in which the boundary conditions, etc. are set. Registered in the object variable/constant and necessary information are ON/OFF information by a flag 84 indicative of whether the boundary condition is needed, ON/OFF information by a flag 85 indicative of whether the initial condition is needed, and ON/OFF of a flag 86 indicative of whether the region shape-dependent information is needed. In the equation information 1, if there is necessary information which has been already set, a flag of "already set" 87 is set in the corresponding section of the matrix table. Otherwise, a flag of "not yet set" or a symbol of "unneeded" is set. In this way, the information supplement management table generally controls necessary information and its status of supplement.

As shown in FIG. 9, after producing the management table, the information supplement guidance process 9 specifies the transition to the mode in which lacking information is supplemented in an interactive manner: (step 92). This mode is to provide a guidance of information input by showing lacking information to the user, thereby directing the extracting procedure of lacking information. According to the setting mode, lacking information is entered by following the guidance: (step 93). The procedure of entry is that initially guidance input A takes place in correspondence to regions: (step 94), or, next a guidance input B takes place in correspondence to variables: (step 95), or a guidance input C takes place in correspondence to information: (step 96).

FIG. 10 is a detailed flowchart for the region-correspondent guidance input shown in FIG. 9. The region-correspondent guidance input is to lead the setting of all lacking information (e.g., conditions, material coefficients, etc.) for each part of region individually.

As shown in FIG. 10, the region-correspondent guidance input is carried out by first, using the information supplement guidance table shown in FIG. 8, highlighting the display 6 in a blinking or painting fashion (step 106) if the setting demand flag is ON (step 104) and the setup status flag is "not yet set" (step 105) for all object parts (S1, S2, ..., L1, L2, ...) individually: (step 101), for all object variables and constants (A, B, C, ...) individually: (step 102), and for all supplement information of these variables and constants (boundary conditions, initial conditions, region-dependent information, etc.) individually: (step 103). The user can choose, in the above-mentioned step 92, which of the steps 101, 102 and 103 be carried out first and the order of display for them. Through the highlighted display, the user is informed of the position and given the indication of the object variables/constants and the type of supplement information in attention on the display screen: (step 107). Until a proper entry is made for the demanded information: (step 108), the system monitors data input on the keyboard: (step 109) and verifies the input data: (step 1010). Upon completion of entry, the corresponding setup status flag 87 in the information supplement management table is reset: (step 1011). The processes of steps 106, 107, 108, etc. are carried out using the display screen and keyboard shown in FIG. 1.

Figure 11:
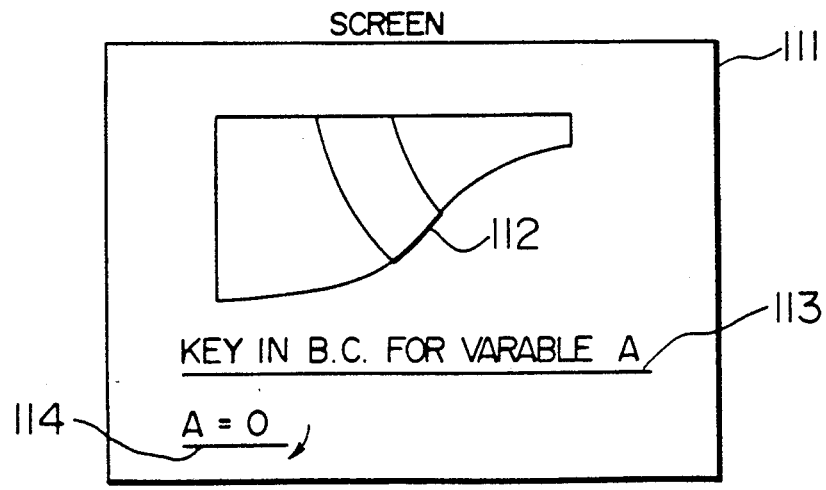
FIG. 11 is a diagram showing an example of the display screen presenting guidance information for information input.

FIG. 11 is a diagram showing an example of guidance display on the screen in FIG. 5. Shown here is the highlighted display (step 106) and the display of object variables and the type of supplement information (step 107) as in the case of FIG. 10.

After the object figure has been displayed on the screen 111, the object part 112 is displayed by blinking if the object variable/constant and supplement information have not yet entered and, at the same time, the type of information is displayed, thereby prompting the user to enter the supplement information B and C (boundary conditions) for the object variable A: (step 113). When the user has entered data, the data input (e.g., A=0) 114 is displayed at the bottom (step 114).

The matching check for input data (step 1010) in FIG. 10 is to check whether the entered boundary condition etc. match with the partial differential equation in the already given equation information (input information 2 in FIG. 5).

Next, variable-correspondent input B (step 95) in FIG. 9 is to set all information in all parts of each variable. Specifically, in FIG. 10, the order of steps 101 and 102 is reversed to check all object variables and constants individually at first, and next to check all object parts individually. The remaining process is exactly identical to FIG. 10.

The information correspondent guidance input C (step 96) in FIG. 9 is to set corresponding information (e.g., boundary condition) in each object part of each variable in correspondence to each information. Specifically, in FIG. 10, the process of step 103 is carried out first, which is followed by steps 101, 102, 104, and so on.

Each of the region correspondent setting mode, variable correspondent setting mode and information correspondent mode in FIG. 9 can readily be executed by searching the information supplement management table horizontally, vertically or in a different manner. Other setting modes are still conceivable. It is of course possible to change the setting mode during the guidance process and proceed with the process.

Through the procedures described above, the guidance-oriented information setting process 5 in FIG. 5 has now successfully entered the required amount of shape information and equation information, and by entering this information to the program generating program 10 and by executing the program, the numerical computation program 11 can be generated.

Although the embodiment deals with a two-dimensional region for the simplicity of explanation, three-dimensional cases can be realized in the same way as two-dimensional cases with only modification of setting parts being made from sides to planes and from planes to stereographic structures.

Variations of the inventive program generation method include: (a) a method in which information which references the shape information 1 is not given at all initially in the equation information 2 and guidance input by the information supplement guidance process 9 is mostly followed, and (b) a method in which information which references the shape information 1 is given at the initial input and only lacking information is supplemented in accordance with the guidance. The former method allows the management of shape information and equation information as completely independent ones, enabling the same equation information to be applied to various shape information, whereby the amount of work of entering a simulation model can be reduced significantly. The latter method resembles the foregoing embodiment, and it will not be described in detail.

As a further variation (c), it is designed that a set of sides and planes can be defined in the shape information 1, object parts are extracted in units of set, and a guidance mode for supplementing information is provided, thereby reducing the frequency of interactive operation based on the interactive guidance, and it becomes possible to set efficiently the same conditions, material coefficients, etc.

As described, in this embodiment the correspondence between shape information and equation information can be obtained without depending on the quotation of names or the specification of selection (pick) by the user, as in the conventional case, and consequently setting for a complex shape can be done easily. Accordingly, particularly in the case of a three-dimensional region, the user is rid of inherent difficulty ascribed to the display of three-dimensional information on a two-dimensional display screen in selecting intended parts.

While particular embodiments of the invention have been shown and described, it will be obvious to those skilled in the art that various changes and modifications may be made without departing from the present invention in its broadest aspect.

I claim:

1. A method comprising the steps by a computer, the steps performed including the steps of:
   (a) entering, to said computer, region information indicative of a spatial region in which said physical phenomenon takes place, and a part of equation information required for the numerical simulation, the part including at least information for a partial differential equation which governs the physical phenomenon;
   (b) detecting, based upon the entered region information and the entered part of the equation information, a lacking part of the required equation information and a part in said spatial region to which the lacking part of the required equation information relates;
   (c) displaying the spatial region so that the detected parts can be discriminated from the other parts of the spatial region and displaying the detected lacking part of the required information, so as to prompt a user in an interactive manner to enter the lacking part of the required equation information with respect to the detected part of the spatial region;
   (d) receiving in said computer the lacking part of the required equation information entered by the user as prompted by said display; and
   (e) generating a numerical simulation program using both the region information and the part of the required equation information entered initially and a supplementary part of the required equation information entered by the user.

2. A method according to claim 1, wherein said detecting step includes the steps of:
   determining, based on the entered part of the required equation information, which information among a boundary condition and an initial condition is required, for a variable appearing in the entered part of the required equation information; and
   judging whether the entered part of the required equation information already includes information determined as required by the determining step, for each of parts of the spatial region for which parts the information is required, so as to detect a lacking part of the required equation information and a part of the spatial region to which the lacking part of the required equation information relates.

3. A method according to claim 2, wherein said determining step is executed, depending upon whether a second-order partial derivative of the variable is included in the partial differential equation and upon whether the variable is time-dependent.

4. A method according to claim 2, wherein said detecting step further includes the steps of:
   determining whether a position-dependent value is required for a constant included in the entered part of the required information; and
   judging whether the entered part of the required equation information already included a position-dependent value as required by the determining step for each of parts of the spatial region for which parts the value is required.

5. A method according to claim 4, wherein said determining step for the constant is executed depending upon at least whether the constant is included in the partial differential equation.

6. A method according to claim 1, wherein said detecting step and said displaying step are repeated for plural lacking parts of the required equation information in such a manner that lacking parts of the required equation information which relate to a same part of the spatial region are detected and are sequentially displayed so that a succeeding one of the lacking parts is displayed after entering, by a user, of a preceding one of the lacking parts.

7. A method according to claim 1, wherein said detecting step and said displaying step are repeated for plural lacking parts of the required equation information in such a manner that lacking parts of the required equation information which relates to a same variable are detected and are sequentially displayed so that a succeeding one of the lacking parts is displayed after entering, by a user, of a preceding one of the lacking parts.

8. A method according to claim 1, wherein said detecting step and said displaying step are repeated for plural lacking parts of the required equation information in such a manner that lacking parts of the required equation information which relate to a same kind of information are detected and are sequentially displayed so that s succeeding one of lacking parts is displayed after entering, by a user, of a preceding one of the lacking parts.

9. A method according to claim 1, wherein said required equation information changes depending upon the partial differential equation, as to whether the required equation information should include all of a boundary condition on a variable included in an initial condition on the variable and a value of a constant required to solve the equation.

10. A method for making a computer simulation model for numerical simulation for a physical phenomenon, the method comprising the steps of:
    (a) entering, to a computer, region information indicative of a spatial region in which said physical phenomenon takes place, and a part of equation information required for the numerical simulation, the part including at least information for a partial differential equation which governs the physical phenomenon;

(b) detecting, based upon the entered region information and the entered part of the equation information, a lacking part of the required equation information and a part in said spatial region to which the lacking part of the required equation information relates;

(c) displaying the spatial region so that the detected part can be discriminated from the other parts of the spatial region and displaying the detected lacking part of the required information so as to prompt a user in an interactive manner to enter the lacking part of the required equation information with respect to the detected part of the spatial region; and (d) receiving in said computer the lacking part of the required equation information entered by the user as prompted by said display.

11. A method according to claim 10, wherein said detecting step includes the steps of:

determining, based on the entered part of the required equation information, which information among a boundary condition and an initial condition is required, for a variable appearing in the entered part of the required equation information; and judging whether the entered part of the required equation information already includes information determined as required by the determining step, for each of parts of the spatial region for which parts the information is required, so as to detect a lacking part of the required equation information and a part of the spatial region to which the lacking part of the required equation information relates.

12. A method according to claim 11, wherein said determining step is executed, depending upon whether a second-order partial derivative of the variable is included in the partial differential equation and upon whether the variable is time-dependent.

13. A method according to claim 11, wherein said detecting step further includes the steps of:

determining whether a position-dependent value is required for a constant included in the entered part of the required information; and judging whether the entered part of the required equation information already includes a position-dependent value as required by the determining step for each of parts of the spatial region for which parts the value is required.

14. A method according to claim 13, wherein said determining step for the constant is executed depending upon at least whether the constant is included in the partial differential equation.

15. A method according to claim 10, wherein said detecting step and said displaying step are repeated for plural lacking parts of the required equation information in such a manner that lacking parts of the required equation information which relate to a same part of the spatial region are detected and are sequentially displayed so that a succeeding one of the lacking parts is displayed after entering, by a user, of a preceding one of the lacking parts.

* * * * *